(No Model.)  A. J. MADRA.  2 Sheets—Sheet 1.
SEED PLANTER.

No. 294,800.  Patented Mar. 11, 1884.

WITNESSES
F. L. Ourand
E. G. Siggers.

Andrew J. Madra,
INVENTOR
by C. A. Snow & Co.
Attorneys (No Model.) 2 Sheets—Sheet 2.
A. J. MADRA.
SEED PLANTER.
No. 294,800. Patented Mar. 11, 1884.
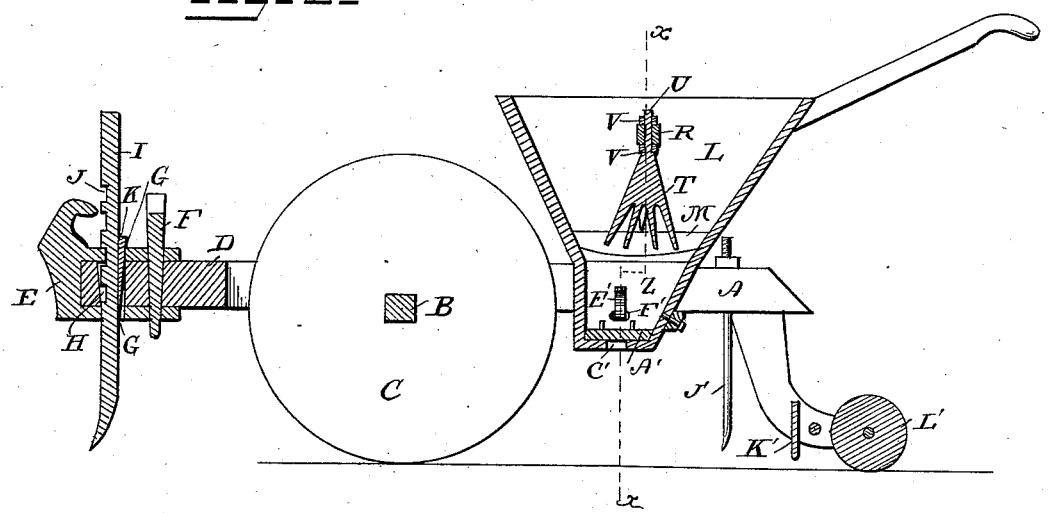
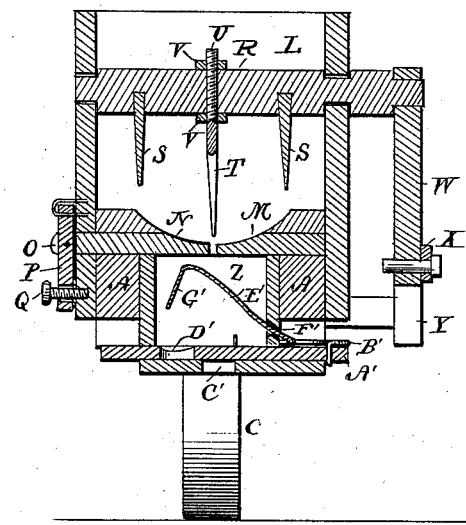
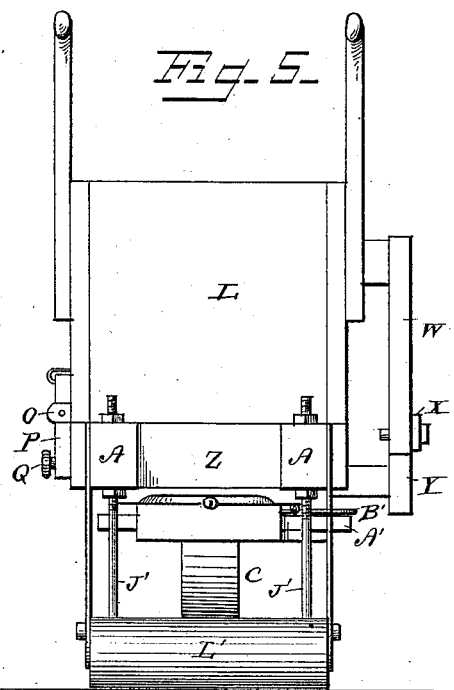
WITNESSES
F. L. Ourand
E. G. Siggers,
A. J. Madra,
INVENTOR
by C. A. Snow & Co,
Attorneys

UNITED STATES PATENT OFFICE.

ANDREW JACKSON MADRA, OF FORT SMITH, ARKANSAS.

SEED-PLANTER.

SPECIFICATION forming part of Letters Patent No. 294,800, dated March 11, 1884.

Application filed October 19, 1883. (No model.)

*To all whom it may concern:*

Be it known that I, ANDREW J. MADRA, a citizen of the United States, residing at Fort Smith, in the county of Sebastian and State of Arkansas, have invented a new and useful Seed-Planter, of which the following is a specification, reference being had to the accompanying drawings.

This invention relates to seed-planters; and it has for its object to produce a machine for planting cotton-seed, corn, pear, and other seed, which shall be simple in construction, inexpensive, and easily operated.

To this end my invention consists in certain improvements in the construction of the same, which will be hereinafter fully described, and particularly pointed out in the claims.

Figure 1:
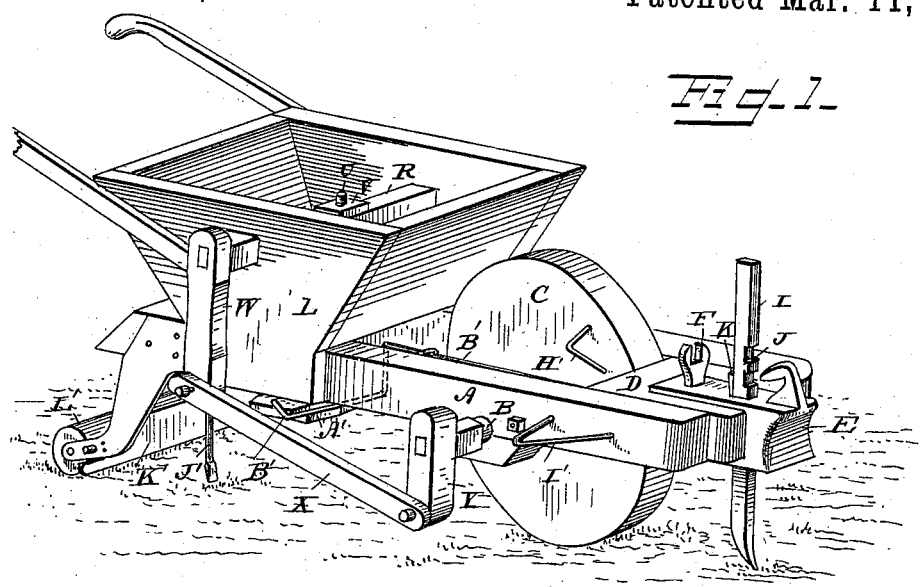
Figure 2:
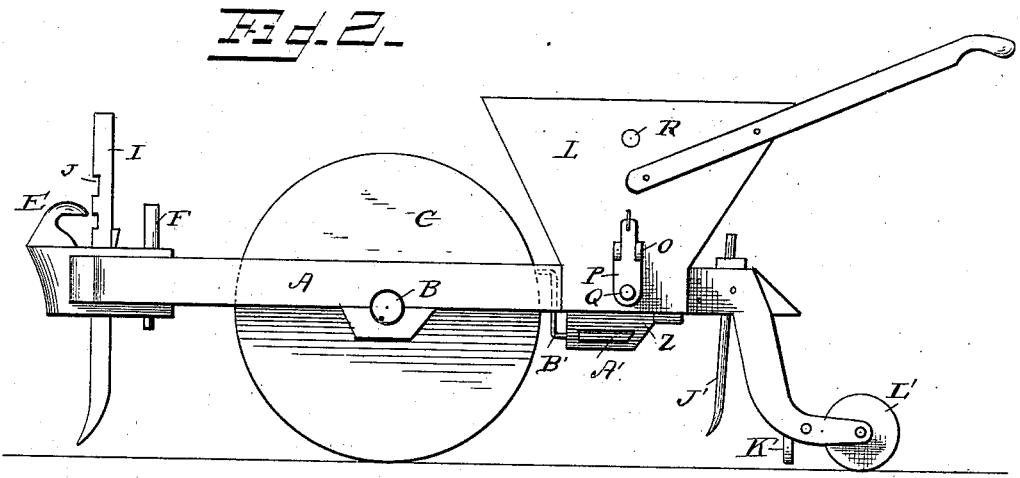

In the drawings hereto annexed, Figure 1 is a perspective view. Fig. 2 is a side view. Fig. 3 is a longitudinal vertical sectional view. Fig. 4 is a transverse vertical sectional view on the line $x\ x$ in Fig. 3. Fig. 5 is a rear view.

The same letters refer to the same parts in all the figures.

A in the drawings designates the frame, which has the transverse axle B, carrying the transporting and operating wheel C. At the front end of the frame is a block or cross-piece, D, to which a clevis or clamp, E, is secured by means of a vertical pin or bolt, F, said clevis being provided with a hook or other suitable means for the attachment of the draft. The top and bottom of the clevis E are provided with rectangular openings G, registering with a larger rectangular opening, H, in the block D, and serving to receive the shank I of the furrow-opener. Said shank is provided in its front sides with notches J, any one of which may be brought into engagement with the upper part of the clevis, and held in position by means of a wedge, K, driven behind the shank. In this manner the depth of the furrow may be regulated. The clevis E is held with a great degree of security by the joint action of the pin or bolt F and the shank I. The rear end of the frame supports a hopper, L, which is of ordinary construction, and the bottom of which is composed of a stationary piece, M, and a slide, N, which latter has an arm, O, extending through the side of the hopper and connected pivotally with a lever, P, pivoted to the side of the hopper.

Q is a thumb-screw passing through a perforation in the lower end of the said lever and working in the side of the hopper. It will be seen that by manipulating the said thumb-screw the slide N may be moved in either direction and retained in any desired position, thereby regulating the quantity of seed to be planted. The sides of the hopper L are provided near their upper edges with bearings for a transverse rock-shaft, R, having stationary downwardly-projecting fingers S, and a centrally-located forked stirrer, T, having a screw-threaded shank, U, extending through the said rock-shaft and held by means of clamping-nuts V V, thus rendering the said stirrer vertically adjustable. One end of the rock-shaft R extends through the side of the box or hopper, and is provided with a crank, W, connected by a pitman, X, with a crank, Y, upon the axle B, from which motion is thus transmitted to the rock-shaft.

Secured to the frame A, under the hopper L, is a seed-box, Z, having a transversely-moving slide, A', the outer end of which is pivotally connected with the rear end of a spring, B', secured to the inside of the frame. The bottom of the seed-box Z has an opening, C', and the seed-slide A' has a corresponding opening or seed-cup, D'. The action of the spring B' is to force the seed-slide in an inward direction, thereby closing the seed-opening.

Hinged to the seed-slide, near the outer end of the latter, is a narrow plate or arm, E', which extends inward through a slot, F', in the side of the seed-box and over the seed-cup, where it is provided with a downwardly-extending finger or scraper, G'. When in operation the slide is moved in an inward direction, the said scraper is raised from the bottom of the box, but as it moves outwardly the scraper descends and scrapes the seed out through the seed-opening in the bottom of the box. The spring B', by which the seed-slide A' is operated, is during the operation of the machine actuated by cams H' upon the side of the transporting-wheel, the distance between said cams regulating the distance between the hills. The side of the frame A is provided near its front end with a triangular wire-guard, I', forming a fender against stumps and other obstructions. The rear end of the frame carries the coverers J, and is provided with a drag, K', and a roller, L', for leveling and compressing the soil.

The operation and advantages of the invention will be readily understood from the foregoing description, taken in connection with the drawings hereto annexed. It is simple, convenient, easily operated, and efficient for the purposes set forth.

I claim as my invention and desire to secure by Letters Patent of the United States—

1. The combination of the seed-box, the seed-slide having a hinged arm extending inwardly through a slot in the side of the seed-box and provided at its inner end with a downturned scraper, and suitable mechanism for reciprocating the seed-slide, as set forth.

2. The combination of the hopper, the rock-shaft having the stirrers, the seed-box arranged under the hopper and having the transversely movable seed-slide, equipped with a scraper-arm extending inwardly through a slot in the side of the said seed-box, a spring secured to the side of the frame and having its rear end connected pivotally with the outer end of the seed-slide, which is thereby forced in an inward direction, and the transporting-wheel provided on one side with cams engaging and operating the said spring, as set forth.

In testimony that I claim the foregoing as my own I have hereto affixed my signature in presence of two witnesses.

ANDREW JACKSON MADRA.

Witnesses:
ELDRIDGE MCFADDEN,
I. W. BEASWELL.